(12) United States Patent
Miura et al.

(10) Patent No.: US 6,987,720 B2
(45) Date of Patent: Jan. 17, 2006

(54) INFORMATION RECORDING AND/OR REPRODUCING APPARATUS, INFORMATION RECORDING AND/OR REPRODUCING METHOD, AND PHASE-CHANGE RECORDING MEDIUM FOR USE IN THE APPARATUS AND THE METHODS

(75) Inventors: Hiroshi Miura, Kanagawa (JP); Kazunori Ito, Kanagawa (JP); Akihiko Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 409 days.

(21) Appl. No.: 09/902,699

(22) Filed: Jul. 12, 2001

(65) Prior Publication Data

US 2002/0021643 A1 Feb. 21, 2002

(30) Foreign Application Priority Data

| Jul. 13, 2000 | (JP) | ............................. 2000-212512 |
| Feb. 28, 2001 | (JP) | ............................. 2001-053390 |
| Mar. 26, 2001 | (JP) | ............................. 2001-086813 |

(51) Int. Cl.
G11B 7/00 (2006.01)

(52) U.S. Cl. .................................................. 369/59.11
(58) Field of Classification Search ............. 369/59.11, 369/13.26, 59.24, 102, 109.02, 116, 47.28, 369/59.19
See application file for complete search history.

(56) References Cited

U.S. PATENT DOCUMENTS

| 5,144,615 | A | * | 9/1992 | Kobayashi .................. 369/176 |
| 5,408,456 | A | * | 4/1995 | Hosoya .................... 369/59.17 |
| 5,555,236 | A | * | 9/1996 | Hasegawa .................... 369/116 |
| 5,598,392 | A | * | 1/1997 | Izumi et al. ............. 369/59.22 |
| 5,598,396 | A | * | 1/1997 | Horibe et al. ............ 369/47.25 |
| 5,631,887 | A | * | 5/1997 | Hurst, Jr. .................. 369/47.53 |
| 5,761,179 | A | * | 6/1998 | Iwasaki et al. ........... 369/59.11 |
| 5,802,031 | A | * | 9/1998 | Clark et al. ............. 369/59.11 |
| 6,312,780 | B1 | * | 11/2001 | Kasami et al. ............. 428/64.1 |
| 6,324,145 | B1 | * | 11/2001 | Kobayashi et al. ....... 369/59.17 |
| 6,680,887 | B2 | * | 1/2004 | Shihara et al. ........... 369/44.32 |
| 2002/0034604 | A1 | * | 3/2002 | Arioka et al. ............. 428/64.4 |

FOREIGN PATENT DOCUMENTS

| JP | 60187933 A | * | 9/1985 |
| JP | 02096937 A | * | 4/1990 |

* cited by examiner

Primary Examiner—Craig A. Renner
Assistant Examiner—Peter Vincent Agustin
(74) Attorney, Agent, or Firm—Oblon, Spivak, McClelland, Maier & Neustadt, P.C.

(57) ABSTRACT

An information recording apparatus for recording multi-leveled information in a phase-change recording medium by the application of a laser beam thereto by modifying a power level of the laser beam into two or more power levels so as to correspond to the multi-leveled information to be recorded, and setting a plurality of recording mark units including therein at least one recording mark to be formed, based on the modified power levels, so as to correspond to the multi-leveled information, an information reproducing apparatus for reproducing multi-leveled information recorded in the phase-change recording medium with the application of a laser beam thereto, and an information recording and reproducing apparatus, and an information recording method, an information reproducing method, and a phase-change recording medium for use in the above apparatus are disclosed.

12 Claims, 6 Drawing Sheets

INFORMATION RECORDING AND/OR REPRODUCING APPARATUS, INFORMATION RECORDING AND/OR REPRODUCING METHOD, AND PHASE-CHANGE RECORDING MEDIUM FOR USE IN THE APPARATUS AND THE METHODS

BACKGROUND OF THE INVENTION

1. Field of the Invention

The present invention relates to an information recording apparatus for optically recording multi-leveled information with high density in a phase-change recording medium comprising a recording layer which comprises a phase-change recording material.

The present invention also relates to an information reproducing apparatus for optically reproducing multi-leveled information recorded in the phase-change recording medium.

The present invention also relates to an information recording and reproducing apparatus for conducting the above-mentioned recording and reproduction.

The present invention also relates to an information recording method and an information reproducing method which can be respectively used in the information recording apparatus and in the information reproducing apparatus.

The present invention also relates to a phase-change recording medium for use in the information recording apparatus, the information reproducing apparatus, the information recording and reproducing apparatus, the information recording method, and the information reproducing method.

2. Discussion of Background

As one of optical recording media which are capable of recording information therein and reproducing recorded information therefrom with the application of a laser beam thereto, there is conventionally known a rewritable recording medium comprising a recording layer which comprises a phase-change recording material. The phase-change recording material used in the recording layer of the rewritable recording medium is capable of performing reversible phase changes between an amorphous phase and a crystalline phase, so that the rewritable recording medium has such excellent advantages over conventional recording media that (1) recording and erasing of information can be carried out, using a simple optical system and that (2) new information can be easily recorded in the recording layer, while previously recorded information is being erased therefrom at the same time.

Generally, in such a phase-change recording medium as mentioned above, an amorphous portion in the recording layer is used as a recorded portion, while a crystalline portion in the recording layer is used as an erased or non-recorded portion, The recording of information is actually carried out by applying a laser beam having a power on a recording power level to a recording layer in a crystalline state of the recording medium to heat the laser-beam applied portions of the recording layer to the melting point thereof or to a temperature above the melting point thereof, and then rapidly cooling the heated portions to form recording marks in an amorphous state in the recording layer so as to correspond to the information to be recorded.

The recorded information can be erased by the steps of (1) applying a laser beam having a power on an erasing power level to the recording layer of the recording medium to elevate the temperature of the recording layer to a crystallization temperature thereof, and (2) then gradually cooling the recording layer, thereby crystallizing the recording marks in the amorphous state in the recording layer.

The recording marks are in the amorphous state and the background thereof is in the crystalline state. The recording marks in the amorphous state and the background in the crystalline state have a different reflectivity or a different phase in the light reflected therefrom. By use of such differences between the recording marks and the background thereof in the recording medium, the changes in the quantity of the light reflected by the recording medium can be detected, and recorded information can be reproduced by detecting the changes in the quantity of the light reflected by the recording medium. The recording medium may be in the form of a disk.

In the above-mentioned information recording method using the phase changes in the recording layer, in order to attain high recording density, it is necessary to reduce the size of the recording marks. However, there is a limit to the reduction in the size of the recording mark.

Furthermore, in the phase-change recording by forming recording marks in the above-mentioned heat mode, the shape of the recording marks is act to be significantly affected by the variation in the amount of light of the laser bean. When the shape of the recording marks is varied, as a matter of course, the recording of information and the reproducing of recorded information cannot be carried out precisely in a stable manner.

SUMMARY OF THE INVENTION

It is therefore a first object of the present invention to provide an information recording apparatus which is capable of recording multi-leveled information in a phase-change recording medium precisely in a stable manner.

A second object of the present invention is to provide an information reproducing apparatus which is capable of reproducing multi-leveled information recorded in a phase-change recording medium precisely in a stable manner.

A third object of the present invention is to provide an information recording and reproducing apparatus which is capable of recording multi-leveled information in a phase-change recording medium, and reproducing multi-leveled information recorded in a phase-change recording medium, both precisely in a stable manner.

A fourth object of the present invention is to provide an information recording method for recording multi-leveled information in a phase-change recording medium precisely in a stable manner.

A fifth object of the present invention is to provide an information reproducing method for reproducing multi-leveled information recorded in a phase-change recording medium precisely in a stable manner.

A sixth object of the present invention is to provide an information recording and reproducing method for recording multi-leveled information in a phase-change recording medium and reproducing multi-leveled information recorded in a phase-change recording medium, both precisely in a stable manner.

A seventh object of the present invention is to provide a phase-change recording medium for use in the above-mentioned information recording apparatus, information reproducing apparatus, information recording and reproducing apparatus, information recording method, information reproducing method, and information recording and reproducing method.

A first object of the present invention can be achieved by an information recording apparatus for recording multi-leveled information in a phase-change recording medium by the application of a laser beam thereto, comprising:

power level modification means for modifying a power level of the laser beam into two or more power levels so as to correspond to the multi-leveled information, and setting a plurality of recording mark units including therein at least one recording mark to be formed, based on the modified power levels, so as to correspond to the multi-leveled information.

In the above information recording apparatus, it is preferable that each of the recording mark units have a power level that corresponds to the total area of the one or more recording marks included in each of the recording mark units.

Further, in the above information recording apparatus, it is also preferable that each of the recording mark units include one recording mark and have a track-direction length in a range of 0.5 to 1.0 times a beam diameter defined by $1/e^2$, and that the area of the recording mark in each of the recording mark units be changed for recording the multi-leveled information.

The second object of the present invention can be achieved by an information reproducing apparatus for reproducing multi-leveled information recorded in a phase-change recording medium in the form of recording marks by the application of a recording laser beam thereto, by the application of a reproducing laser bean thereto, comprising:

reproducing means for reproducing the recording marks based on reference clock signals, with the timing of detecting a mark edge of each of the recording marks and the timing of detecting the intensity of a reflection light from each of the recording marks being made different.

In the above information reproducing apparatus, it is preferable that the reproducing laser beam have a smaller beam diameter than a beam diameter of the recording laser beam in terms of a beam diameter defined by $1/e^2$.

The third object of the present invention can be achieved by an information recording and reproducing apparatus for recording multi-leveled information in a phase-change recording medium by the application of a recording laser beam thereto, reproducing multi-leveled information recorded in a phase-change recording medium by the application of a reproducing laser beam thereto, comprising:

power level modification means for modifying a power level of the recording laser beam into two or more power levels so as to correspond to the multi-leveled information, and setting a plurality of recording mark units including therein at least one recording mark to be formed, based on the modified power levels, so as to correspond to the multi-leveled information, and reproducing means for reproducing the recording marks based on reference clock signals, with the timing of detecting a mark edge of each of the recording marks and the timing of detecting a reflection light intensity of each of the recording marks being made different.

In the above information recording and reproducing apparatus, it is preferable that each of the recording mark units have a power level that corresponds to the total area of the one or more recording marks included in each of the recording mark units, Further, in the above information recording and reproducing apparatus, it is also preferable that each of the recording mark units include one recording mark and have a track-direction length in a range of 0.5 to 1.0 times a beam diameter defined by $1/e^2$, and that the area of the recording mark in each of the recording mark units be changed for recording the information.

Further, in the information recording and reproducing apparatus, it is also preferable that the reproducing laser beam have a smaller beam diameter than a beam diameter of the recording laser beam in terms of a beam diameter defined by $1/e^2$.

The fourth object of the present invention can be achieved by an information recording method for recording multi-leveled information in a phase-change recording medium by the application of a laser beam thereto, comprising the steps of:

modifying a power level of the laser beam into two or more power levels so as to correspond to the multi-leveled information, and setting a plurality of recording mark units including therein at least one recording mark to be formed, based on the modified power levels, so as to correspond to the multi-leveled information.

In the above information recording method, it is preferable that each of the recording mark units have a power level that corresponds to the total area of the one or more recording marks included in each of the recording mark units.

In the above information recording method, it is also preferable that each of the recording mark units include one recording mark and have a track-direction length in a range of 0.5 to 1.0 times a beam diameter defined by $1/e^2$, and that the area of the recording mark in each of the recording mark units be changed for recording the multi-leveled information.

In the above information recording method, it is preferable that in modifying the power level of the laser beam, at least one of the power levels be further changed in a power level retention time thereof in accordance with the multi-leveled information.

In the above information recording method, in modifying the power level of the laser beam, it is also preferable that the power level of the laser beam be modified into three power levels, namely, a recording power level, an erasing power level and a bias power level, with the respective power levels thereof being set in a decreasing order of the recording power level, the erasing power level, and the bias power level (the recording power level>the erasing power level>the bias power level).

Furthermore, in the above information recording method, it is preferable that in modifying the power level of the laser beam, at least one of the recording power level or the bias power level be further changed in a power level retention time thereof in accordance with the multi-leveled information.

The fifth object of the present invention can be achieved by an information reproducing method for reproducing multi-leveled information recorded in a phase-change recording medium in the form of recording marks by the application of a recording laser beam thereto, by the application of a reproducing laser bean thereto, comprising the step:

reproducing the recording marks based on reference clock signals, with the timing of detecting a mark edge of each of the recording marks and the timing of detecting a reflection light intensity of each of the recording marks being made different.

In the above-mentioned information reproducing method, it is preferable that the reproducing laser beam have a smaller beam diameter than a beam diameter of the recording laser beam in terms of a beam diameter defined by $1/e^2$.

The sixth object of the present invention can be achieved by an information recording and reproducing method for recording multi-leveled information in a phase-change recording medium by the application of a recording laser beam thereto, and reproducing multi-leveled information recorded in a phase-change recording medium by the application of a reproducing laser beam thereto, comprising steps:

modifying a power level of the recording laser beam into two or more power levels so as to correspond to the multi-leveled information, setting a plurality of recording mark units including therein at least one recording mark to be formed, based on the modified power levels, so as to correspond to the multi-leveled information, and reproducing the recording marks based on reference clock signals, with the timing of detecting a mark edge of each of the recording marks and the timing of detecting a reflection light intensity of each of the recording marks being made different.

In the above information recording and reproducing method, it is preferable that each of the recording mark units have a power level that corresponds to the total area of the one or more recording marks included in each of the recording mark units.

In the above information recording and reproducing method, it is also preferable that each of the recording mark units include one recording mark and have a track-direction length in a range of 0.5 to 1.0 times a beam diameter defined by $1/e^2$, and that the area of the recording mark in each of the recording mark units be changed for recording the information.

In the above information recording and reproducing method, it is also preferable that the reproducing laser beam have a smaller beam diameter than a beam diameter of the recording laser beam in terms of a beam diameter defined by $1/e^2$.

The seventh object of the present invention can be achieved by a phase-change recording medium comprising a recording layer in which multi-leveled information can be recorded by an information recording method for recording multi-leveled information in a phase-change recording medium by the application of a laser beam thereto, comprising the steps of:

modifying a power level of the laser beam into two or more power levels so as to correspond to the multi-leveled information, and setting a plurality of recording mark units including therein at least one recording mark to be formed, based on the modified power levels, so as to correspond to the multi-leveled information.

In the above phase-change recording medium, it is preferable that the recording layer comprise Sb and Te with a Sb/Te content ratio of 2 to 5 in terms of atomic %, and at least one element selected from the group consisting of Ag, In, Ge, Ga, B, Si, and Al.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will now be explained in detail with reference to FIG. 1.

Figure 1:
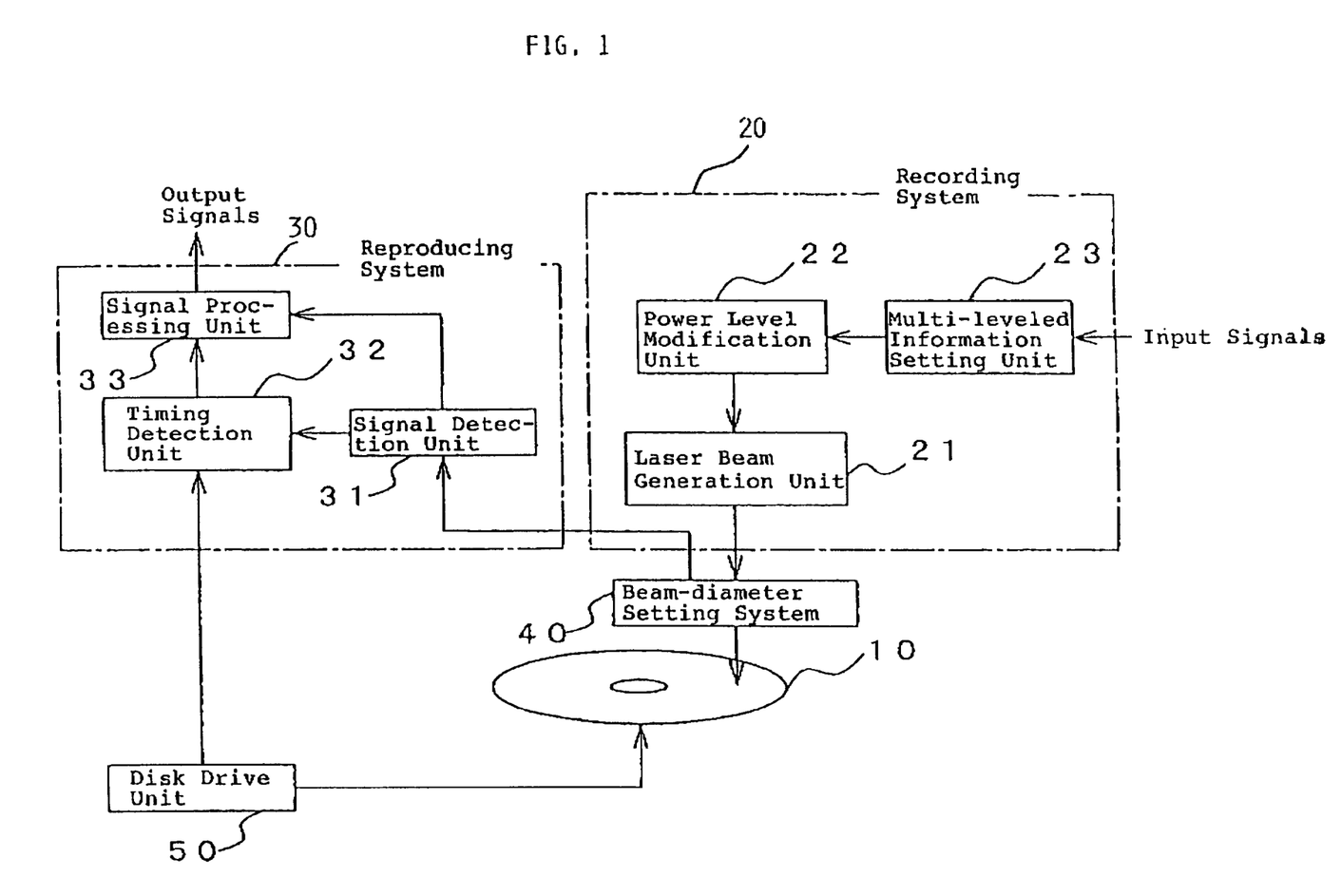
FIG. 1 is a block diagram of an information recording and reproducing system of an example of an information recording and reproducing apparatus of the present invention.

FIG. 1 shows a block diagram of an information recording and reproducing system of an information recording and reproducing apparatus, which is an example of an information recording and reproducing apparatus of the present invention.

As shown in FIG. 1, the information recording and reproducing apparatus comprises a disk 10 which is a phase-change recording medium, a recording system 20 for recording multi-leveled information in the disk 10, a reproducing system 30 for reproducing recorded multi-leveled information from the disk 10, a beam-diameter setting unit 40 for setting the diameter of a laser beam for recording multi-leveled information and also for reproducing recorded multi-leveled information, and a disk drive unit 50 for driving the disk 10 in rotation. The details of the disk 10 will be explained later.

The recording system 20 comprises a laser beam generation unit 21 for generating a laser beam, a power level modification unit 22 for modifying a power level of the laser beam into two or more power levels, and a multi-leveled information setting unit 23 for setting the recording system 20 so as to be capable of recording multi-leveled information with 16 levels by modifying the total area of recording marks.

The reproducing system 30 comprises a signal detection unit 31 for detecting signals output from the disk 10 through the beam-diameter setting unit 40 which will be explained in detail later, a timing detection unit 32 for determining a detection period of signals based on reference clock signals, and a signal processing unit 33 for judging the level of a reflection light from recording marks recorded in the disk 10, based on the signals from the timing detection unit 32.

The beam-diameter setting unit 40 sets a beam diameter of a laser beam for recording, which is hereinafter referred to as "recording laser beam", and a beam diameter of a laser beam for reproducing, which is hereinafter referred to as "reproducing laser beam", in terms of a beam diameter defined by $1/e^2$, for instance, in such a manner that the beam diameter of the reproducing laser beam is smaller than the beam diameter of the recording laser beam.

The disk drive unit 50 drives the disk 10 in rotation and feeds the data of the number of revolutions of the disk 10 back to the timing detection unit 32. In the disk 10, there are formed prepits, and the timing detection unit 32 generates reference clock signals from (1) prepit signals detected by the signal detection unit 31 and (2) the number of revolutions of the disk 10 fed to the timing detection unit 32.

Figure 2:
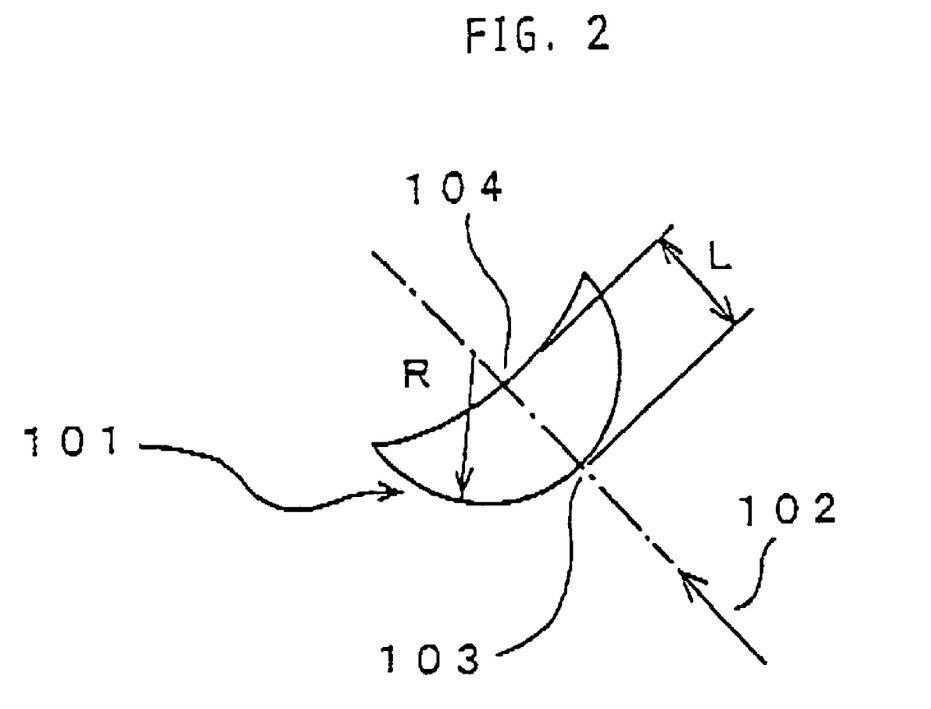
FIG. 2 is a schematic illustration or a shape of a recording mark formed in a phase-change recording medium for use in the present invention.

FIG. 2 is a schematic illustration of a shape of a recording mark 101 formed in a phase-change recording medium for use in the present invention.

As shown in FIG. 2, the recording mark 101 has such a shape that is unsymmetrical with respect to a scanning advancing direction 102 of the laser beam used in the present invention. A leading edge of the recording mark 101, directed to the scanning advancing direction 102 of the laser beam, is hereinafter referred to as leading edge 103, and a rear edge of the recording mark 101, opposite to the leading edge 103, is hereinafter referred to as rear edge 104 of the recording mark 101.

The leading edge 103 can be formed so as to have a sharp edge, with excellent reproducibility, since the shape of the leading edge 103, in terms of the curvature thereof, can be determined in accordance with the diameter of the laser beam employed, and the leading edges 103 of the recording marks can be uniformly formed with respect to the positions thereof within the same recording medium.

In contrast, the rear edge 104 can be easily changed with respect to the shape and the position thereof by changing the power of the laser beam applied to the recording medium, since in the area near the rear edge 104, the state thereof is changed from a rapidly cooled state to a gradually cooled state. In other words, the shape and the position of the rear edge 104 can be easily controlled by changing the power level of the laser beam applied thereto.

In the present invention, by utilizing such properties of the rear edge 104, the recording of multi-leveled information can be easily carried out in a stable manner.

Specifically, in the present invention, the power level of the laser bean employed is modified into two or more power levels so as to correspond to the multi-leveled information to be recorded.

Figure 3:
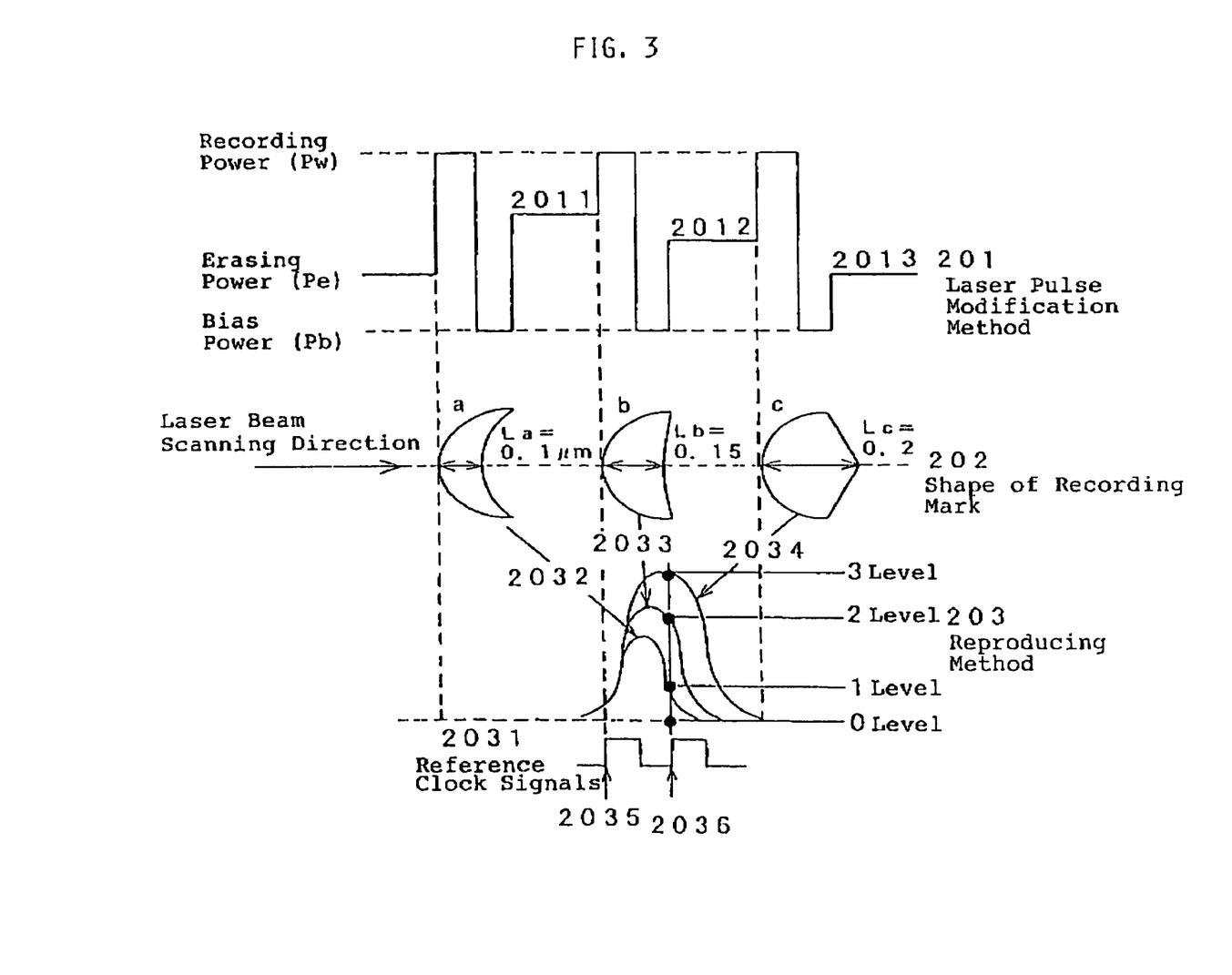
FIG. 3 is a diagram in explanation of a recording laser pulse modification method of the present invention, and the shapes of recording marks formed by the recording laser pulse modification method.

With reference to FIG. 3, when a modification strategy using a recording power (Pw), a bias power (Pb) and an erasing power (Pe) is employed, the position of the rear edge 104 can be controlled, in particular, by the erasing power (Pe), so that the length (L) of the recording mark can be controlled.

For example, with reference to FIG. 3, when an erasing power (Pe) is modified into three power levels within a range of 2 mW to 10 mW, with a recording power (Pw) being set in a range of 8 mW to 15 mW on the surface of a disk, and a bias power (Pb) being set in a range of 0 mW to 1 mw, the shape of the recording mark can be modified into three power levels of a, b and c in accordance with the levels of the erasing power (Pe). By lowering the level of the erasing power (Pe), the rear end of the recording mark can be shifted in the laser beam scanning advancing direction, so that the shape and the area of the recording mark can be changed. In the present invention, by changing the area of each of the recording marks, the recording of multi-leveled information can be facilitated.

In the present invention, there can be set a plurality of recording mark units, each recording mark unit including therein at least one recording mark to be formed, based on the modified power levels, so as to correspond to the multi-leveled information to be recorded. Each of the recording mark units is caused to have such a power level that corresponds to the total area of one or more recording marks included in each recording mark unit, whereby multi-leveled information can be recorded by the power level that is modified so as to correspond to the total area of one or more recording marks included in each recording mark unit.

In the information recording apparatus of the present invention, each of the above-mentioned recording mark units can be set so as to include one recording mark, and has a track-direction length in a range of 0.5 to 1.0 times a beam diameter defined by $1/e^2$, and the area of the recording mark in each of the recording mark unit can be changed for recording the multi-leveled information.

Figure 4:
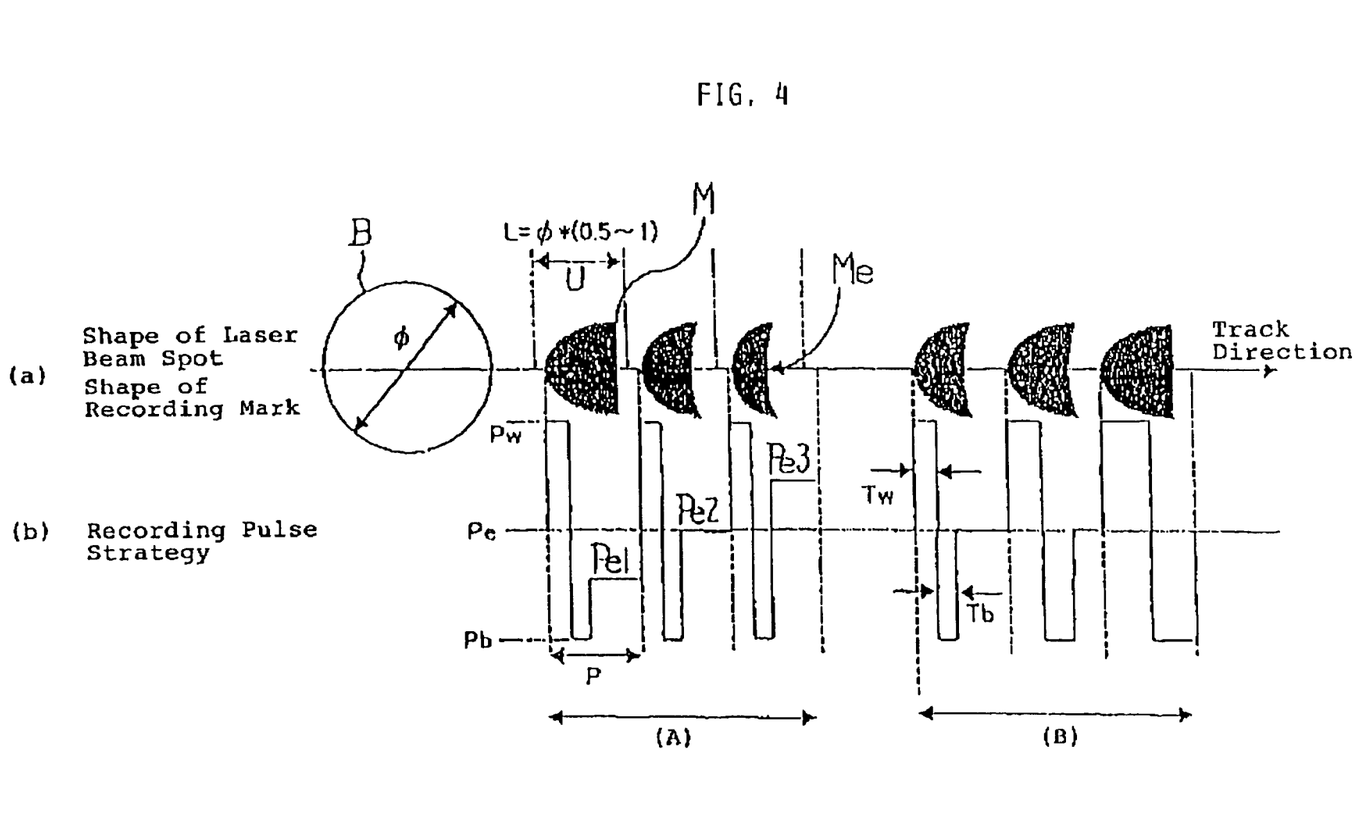
FIG. 4 is a diagram in explanation of an example of an information recording and reproducing method of the present invention, in which (a) shows the shape of a laser beam spot and recording marks formed in a phase-change recording medium, and (b) shows a recording pulse strategy employed.

More specifically, with reference to FIG. 4, one recording mark M is formed in one recording mark unit U. In the information recording method of the present invention, in accordance with the multi-leveled information to be recorded, the length of the recording mark in the direction of a track of a disk of a phase-change recording medium, which is hereinafter referred to as a track-direction mark length, can be changed multi-stepwise. By changing the track-direction mark length of the recording mark, the area of recording mark in each of the recording mark units U can be changed. In other words, the ratio of the area of the recording mark, which is in an amorphous state, to the area of the background thereof, which is in a crystalline state, is changed in accordance with the multi-leveled information to be recorded.

It is preferable that the recording mark unit U have a track-direction length (L) in a range of 0.5 to 1.0 times a beam diameter defined by $1/e^2$, more preferably, in a range of 0.75 to 0.9 times a beam diameter defined by $1/e^2$, and that the recording marks M be formed with a predetermined constant period of P, corresponding to the track-direction length (L).

In the above example of the present invention, by changing the track-direction mark length of the recording mark in the recording mark unit U, the area of the recording mark in the recording mark unit U can be changed, whereby multi-leveled information can be recorded, and the recorded multi-leveled information can be reproduced by detecting the changes in the intensity of the light reflected from the recording mark in each recording mark unit U.

In order to accurately reproduce the changes in the recording marks, various reproducing methods have been devised. In a conventional mark edge detection method, the detection of the edge of the recording mark and the detection of the signal intensity of the recording mark are carried out at the same timing. In contrast to this, in the present invention, the recording marks are reproduced based on reference clock signals, with the timing of detecting the mark edge of each of the recording marks and the timing of detecting the intensity of a reflection light from each of the recording marks being made different.

Furthermore, in the present invention, when the recording marks are reproduced based on reference clock signals, a laser beam diameter of a reproducing laser beam (hereinafter referred to as a reproducing laser beam diameter) can be made smaller than a beam diameter of a recording laser bean (hereinafter referred to as a recording laser beam diameter) in terms of a beam diameter defined by $1/e^2$, whereby the sensitivity for detecting the recording marks can be increased.

For example, when recording is carried out, using a red laser beam with a wavelength of 600 nm to 700 nm, reproducing is carried out, using a blue laser beam with a wavelength near 400 nm. Reproduction may be carried out, using a high NA lens, such as SIL (Solid Immersion Lens). Furthermore, the beam diameter may be changed using a single optical system, with a focusing position being changed.

In the above case, as shown in FIG. 3, based on reproducing signals 2032–2034, a leading mark edge is synchronized with reference clock signal 2031 as indicated by 2035. Since the track-direction mark length of the recording mark is smaller than the reproducing beam diameter, the peak position of the intensity of the reflected light is shifted in the laser beam scanning direction as indicated by 2032, 2033, and 2034. The signal intensities are sampled at the timing delayed by one clock signal from the leading edge. As a result, reproducing signals can be identified as being at 4 levels (0, 1, 2, 3).

With reference to FIG. 4, a method of controlling the track-direction recording mark length so as to be less than a reproducing beam diameter φ of a reproducing laser beam B will now be explained.

To begin with, a power level of a laser beam is modified into two power levels, preferably three power levels. A specific recording pulse strategy of the present invention is shown in (b) in FIG. 4. In this strategy, the power level is modified into three power levels, using rectangular pulses. More specifically, the power level is modified into a recording power level Pw, an erasing power level Pe and a bias power level Pb, with the respective power levels thereof being set in a decreasing order of the recording power level Pw, the erasing power level Pe, and the bias power level Pb (Pw>Pe>Pb). A recording mark M is formed in each recording mark unit U.

The portion A in (b) in FIG. 4 indicates an example of controlling the track-direction recording mark length by changing at least one power level, preferably the erasing power level Pe, in accordance with the multi-leveled information to be recorded. By changing the erasing power level Pe, the taming of the erasing of a rear edge portion Me of the recording mark M can be changed. When the erasing power level Pe is lowered to an erasing power level Pe1, the crystallization speed is decreased and the timing of erasing is delayed, so that the track-direction recording mark length of the recording mark M is increased. When the erasing power level Pe is elevated up to an erasing power level Pe3, the crystallization speed is increased and the timing of erasing comes early, so that the track-direction recording mark length of the recording mark M is decreased. Therefore, by changing the erasing power level Pe to a plurality of erasing power levels, such as Pe1, Pe2 and Pe3, the track-direction recording mark length (corresponding to the area of the recording mark M in the recording mark unit U) can be changed. More specifically, it is preferable that the erasing power level Pe be changed relative to the recording power level Pw in such a range that satisfies the relationship of Pe/Pw=0.0 to 0.7.

The portion B in (b) in FIG. 4 indicates another example of controlling the track-direction recording mark length by changing the retention time of at least one power level in accordance with the multi-leveled information to be recorded. In this example, the recording power level Pw or the bias power level Pb is changed stepwise into a plurality of levels with respect to the power level retention time thereof (which corresponds to the pulse width thereof) Tw or Tb. The portion B in (b) in FIG. 4 indicates a preferable example in which both Tw and Tb are changed, with the ratio of the respective retention times of Tw/Tb being set in a range of 0.3 to 1.5.

When a recording mark M with a short track-direction recording mark length is formed, the power level retention times, Tw and Tb, are shortened, while when a recording mark M with a long track-direction recording mark length is formed, the power level retention times, Tw and Tb, are lengthened. By lengthening the power level retention time Tw, the track-direction recording mark length of the recording mark M is increased, and by lengthening the power level retention time Tb, the cooling time is lengthened, so that the track-direction recording mark length of the recording mark M is further increased, with the rear edge portion Me of the recording mark M being elongated.

For use in the above-mentioned information recording method, a phase-change recording medium comprising a recording layer with the following composition is preferable in view of the above-mentioned control.

Figure 5:
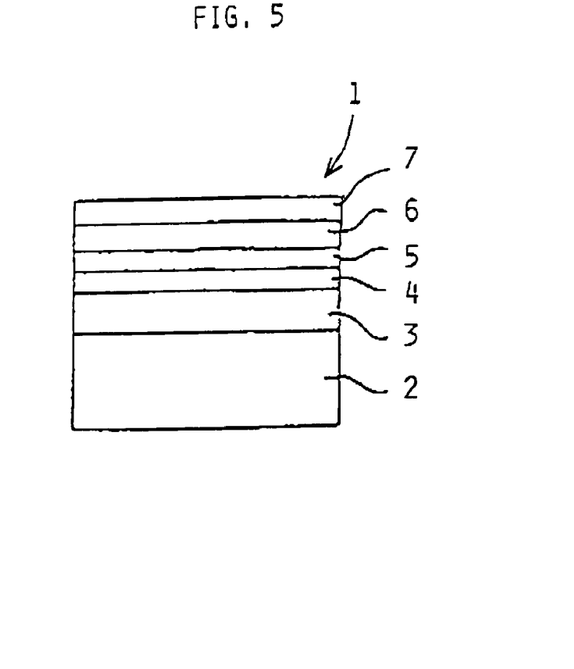
FIG. 5 is a schematic sectional view of an example of a phase-change recording medium of the present invention, particularly showing a layered structure thereof.

FIG. 5 shows a schematic cross-sectional view of the phase-change recording medium, particularly showing a layered structure thereof, which is an example of a phase-change recording medium of the present invention.

In the phase-change recording medium 1 shown in FIG. 5, reference number 4 indicates a recording layer. The recording layer comprises Sb and Te with a Sb/Te content ratio of 2 to 5 in terms of atomic %, preferably with a Sb/Te content ratio of 3 to 4 in terms of atomic %, with Sb and Te constituting a matrix material of this recording layer, and at least one element selected from the group consisting of Ag, In, Ge, Ga, B, Si, and Al, which serves as an additive element to the matrix material. More specifically, examples of preferable compositions of the recording layer are AgInSbTe, GeAgInSbTe, GeInSbTe, GeGaSbTe, and GaSbTe.

The recording layer with the above-mentioned composition exhibits the property that the crystallization speed thereof strongly depends on the power of the laser beam applied thereto. The crystallization speed of the recording layer is so high that the phase-change follow-up properties in response to recording pulses are excellent.

Other features of this invention will become apparent in the course of the following description of exemplary embodiments, which are given for illustration of the invention and are not intended to be limiting thereof.

EXAMPLE 1

A phase-change recording medium comprising (1) a substrate made oil polycarbonate and (2) a phase-change recording layer formed thereon, with a track pitch of 0.74 µm, which is identical to that of DVD (Digital Versatile Disc), was prepared.

In this phase-change recording medium, recording marks were formed as follows:

With reference to FIG. 3, a laser pulse modification method 201 was conducted. The shapes of recording marks formed by the laser pulse modification method 201 are shown by 202.

The wavelength of the laser beam employed was 635 nm, and the numerical aperture of an objective lens employed was 0.6.

The recording power (Pw) was set at 13 mW, and the bias power (Pb) was set at 0.2 mW. The erasing power (Pe) was modified into three power levels, 7.8 mW (2011), 6.5 mW (2012), and 4 mW (2013).

Depending upon the erasing power level, the shape of the recording mark was changed stepwise to 3 kinds. Specifically, lengths La, Lb, and Lc of the recording marks in the laser beam scanning direction were respectively, La=0.1 μm, Lb=0.15 μm, and Lc=0.2 μm.

Thus, by lowering the erasing power level, the rear edge portion of the recording mark was elongated, and the shape of the recording mark was changed as shown in FIG. 3.

EXAMPLE 2

The recording marks formed in the phase-change recording material in Example 1 were reproduced by the reproducing method 203 shown in FIG. 3.

The wavelength of a reproducing laser beam employed was 410 nm, and the numerical aperture of an objective lens employed was 0.7. The power of the reproducing laser beam was 0.6 mW.

In FIG. 3, reference numeral 2031 indicates reference clock signals, and reference numerals 2032 to 2034 respectively indicate reproduction signals of a, b, and c. Based on the reproduction signals, the reference clock signals are synchronized with the leading edges of the recording marks (2035). In order to show this state, in FIG. 3, each reproducing signal corresponding to the leading edge of each recording mark is depicted so as to overlap. Since the track-direction recording mark length is smaller than the diameter of the reproducing laser beam, the peak positions of the signals are shifted in the laser beam scanning direction in the order of a, b, and c, corresponding to the area of each recording mark. As shown in FIG. 3, the intensity of the signal is sampled at such a timing that is delayed from the leading edge by one clock signal. As a result, the reproducing signals can be identified at 4 levels, that is, 0, 1, 2, and 3 (levels 0 to 3). By detecting the intensity of the signal at the position shown in FIG. 3, a large displacement value can be obtained, and therefore the accuracy of the identification of the recording mark is increased.

EXAMPLE 3

As shown in FIG. 5, there was prepared a phase-change recording medium with a layered structure, comprising a polycarbonate substrate 2, a ZnS—$SiO_2$ layer 3, a recording layer 4, a ZnS—$SiO_2$ layer 5, an Ag layer 6, and an overcoat layer 7, which were overlaid in this order. The recording layer 4 was composed of Ge (3 atomic %), Ga (7 atomic %), Sb (65 atomic %), and Te (25 atomic %). The track pitch was 0.4 μm. The numerical aperture NA of an optical system employed was 0.65. The wavelength of a laser beam employed was 405 nm.

Figure 6:
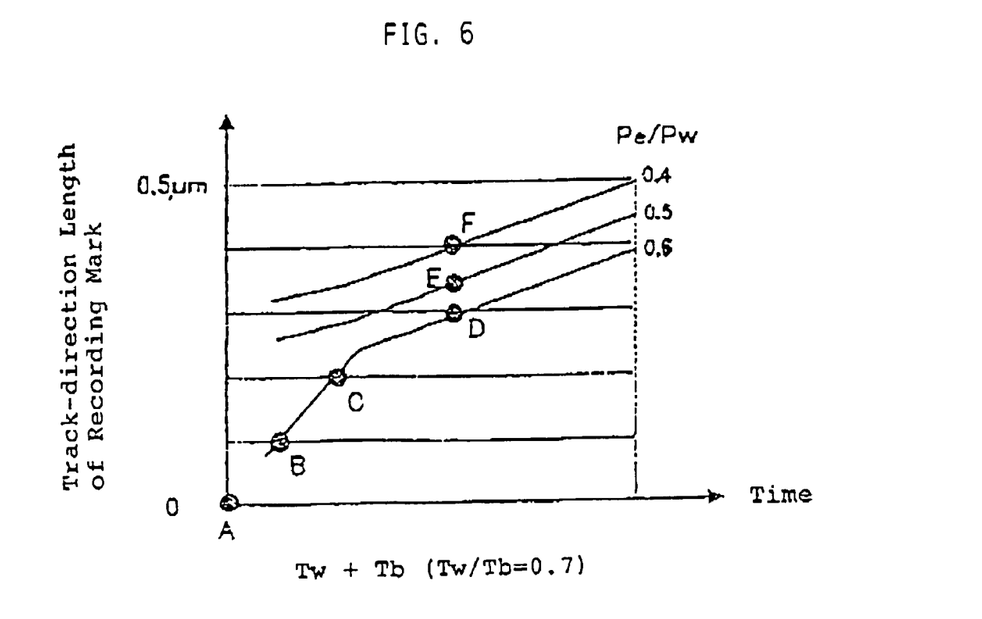
FIG. 6 is a diagram in explanation of the recording conditions in an example of the present invention, and the results of the measurement of the track-direction lengths of recording marks formed.

FIG. 6 shows the recording conditions in this example and the track-direction recording mark lengths measured under the recording conditions. The track-direction length of the recording mark unit was 0.5 μm. The track-direction length of the recording mark M recorded with this period was measured.

In the graph in FIG. 6, the track-direction length of the recording mark M is plotted as ordinate and the sum of the level retention time Tw and the level retention time Tb, that is, Tw+Tb, as abscissa, with the level retention Time Tw and the level retention time Tb being changed, and with the ratio of Tw/Tb being kept constant at 0.7 (Tw/Tb=0.7). The track-direction length of the recording mark M on the ordinate was determined by measuring the distance between the leading edge and the rear edge of the recording mark M at the center of the track.

By increasing the power level ratio of Pe/Pw, the track-direction length of the recording mark M was shortened. Furthermore, by shortening the power level retention time Tw, Tb, the track-direction length of the recording mark M was also shortened.

State F, State E, and State D shown in FIG. 6 indicate the changes in the track-direction length of the recording mark M in the case where the power level retention time, Tw+Tb, was fixed and the power level ratio of Pe/Pw was changed from 0.4 to 0.6. State C and State B shown in FIG. 6 indicate the changes in the case where the power level ratio of Pe/Pw was fixed at 0.6 (Pe/Pw=0.6) and the power retention time, Tw+Tb, was changed.

Thus, the track-direction length of the recording mark M can be changed to 5 levels in the range of 0.4 μm to 0.1 μm. Within a recording mark unit with a track-direction length or 0.5 μm, 6 levels of the intensities of reflection light can be formed when there is included State A where no recording mark M is recorded.

Figure 7:
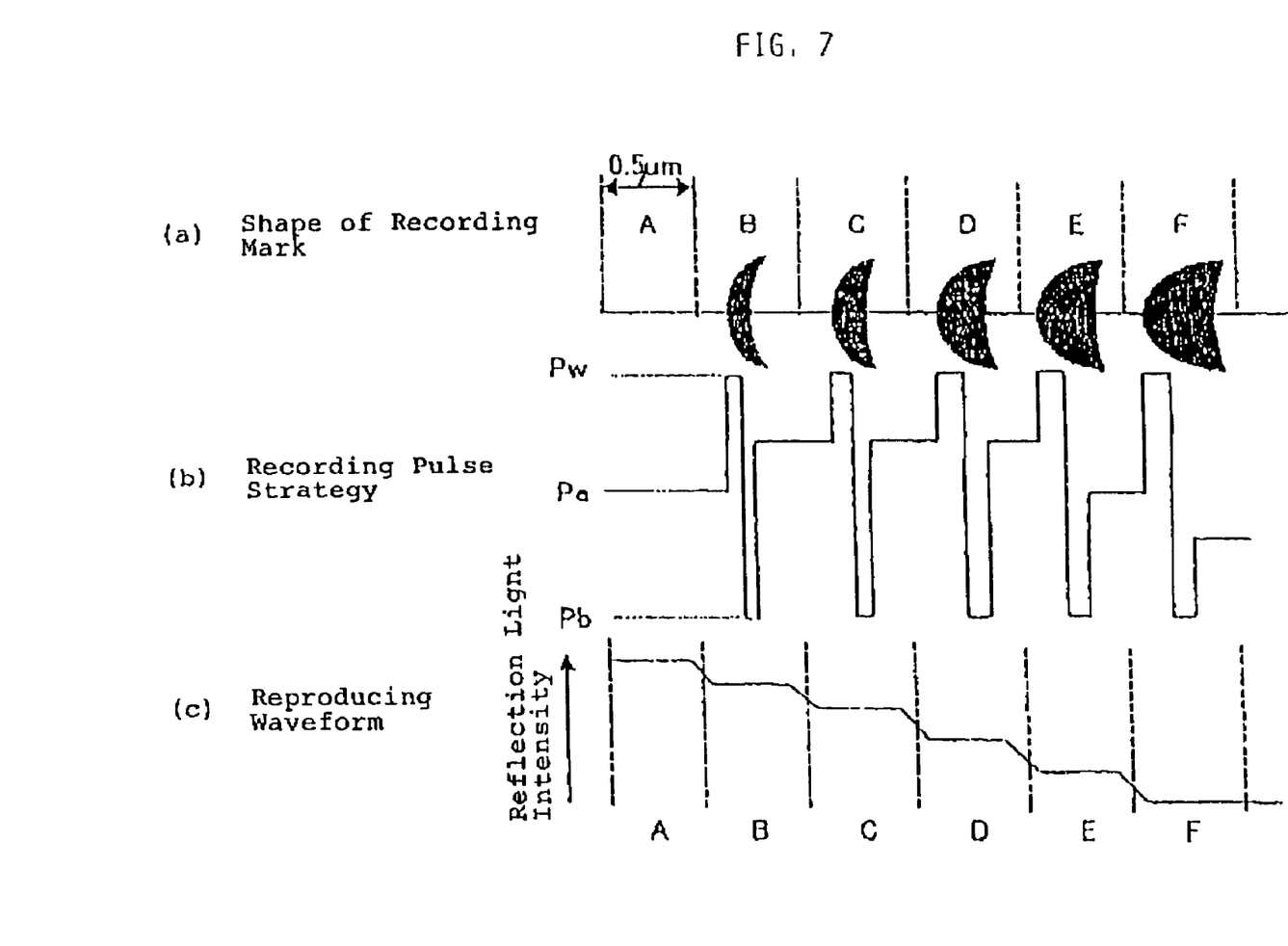
FIG. 7 is a diagram in explanation of another example or an information recording and reproducing method of the present invention, in which (a) shows the shapes of recording marks formed in a phase-change recording medium, (b) shows a recording pulse strategy employed in the example, and (c) shows a diagram in explanation of a reproducing waveform.

FIG. 7 shows a diagram in explanation of recording signals and reproducing waveforms. (a) of FIG. 7 shows the changes in the shape (or the track-direction length) of the recording mark M in a recording mark unit having a track-direction length of 0.5 μm. Each of States A to F corresponded to the conditions shown in FIG. 6, and the recording marks were recorded in accordance with a recording pulse strategy shown in (b) of FIG. 7. (c) in FIG. 7 shows a waveform reproduced from the phase-change recording medium 1 in which the above-mentioned recording marks M were recorded. The changes in the intensity of the reflection light are on ordinate in (c) of FIG. 7. The intensity of the reflection light changed stepwise due to the interference between the recording marks. In accordance with the changes in the area of the recording mark which is in an amorphous state, the levels of the reflection light intensity changes.

When recording is made in the recording layer with the above-mentioned composition by use of the simple recording pulse strategy as shown (b) of FIG. 7, the reflection light intensity can be changed to 6 levels. In other words, 6-leveled information can be recorded and reproduced.

Japanese Patent Application No. 2000-212512 filed Jul. 13, 2000, Japanese Patent Application No. 2001-053390 filed Feb. 28, 2001, and Japanese Patent Application No. 2001-086813 filed Mar. 26, 2001 are hereby incorporated reference.

What is claimed is:

1. An information recording apparatus for recording multi-leveled information in a phase-change recording medium by the application of a laser beam thereto, comprising:

means for modifying a power level of said laser beam into two or more power levels so as to correspond to said multi-leveled information, and for setting a plurality of recording mark units including therein at least one recording mark to be formed, based on said modified power levels, so as to correspond to said multi-leveled information, said means for modifying said power level of said laser beam further changing at least one of said power levels in a level retention time thereof so as to correspond to said multi-leveled information.

2. The information recording apparatus as claimed in claim 1, wherein each of said recording mark units has a power level that corresponds to the total area of said one or more recording marks included in each of said recording mark units.

3. The information recording apparatus as claimed in claim 1, wherein each of said recording mark units includes one recording mark and has a track-direction length in a range of 0.5 to 1.0 times a beam diameter defined by $1/e^2$, and the area of said recording mark in each of said recording mark units is changed for recording said multi-leveled information.

4. An information recording and reproducing apparatus for recording multi-leveled information in a phase-change recording medium by the application of a recording laser beam thereto, reproducing multi-leveled information recorded in a phase-change recording medium by the application of a reproducing laser beam thereto, comprising:
   means for modifying a power level of said recording laser beam into two or more power levels so as to correspond to said multi-leveled information, and setting a plurality of recording mark units including therein at least one recording mark to be formed, based on said modified power levels, so as to correspond to said multi-leveled information, said means for modifying said power level of said recording laser beam further changing at least one of said power levels in a level retention time thereof so as to correspond to said multi-leveled information; and
   means for reproducing said recording marks based on reference clock signals, wherein a timing of detecting a mark edge of each of said recording marks and the timing of detecting a reflection light intensity of each of said recording marks are different.

5. The information recording and reproducing apparatus as claimed in claim 4, wherein each of said recording mark units has a power level that corresponds to the total area of said one or more recording marks included in each of said recording mark units.

6. The information recording and reproducing apparatus as claimed in claim 4, wherein each of said recording mark units includes one recording mark and has a track-direction length in a range of 0.5 to 1.0 times a beam diameter defined by $1/e^2$, and the area of said recording mark in each of said recording mark units is changed for recording said information.

7. The information recording and reproducing apparatus as claimed in claim 4, wherein said reproducing laser beam has a smaller beam diameter than a beam diameter of said recording laser beam in terms of a beam diameter defined by $1/e^2$.

8. An information recording method for recording multi-leveled information in a phase-change recording medium by the application of a laser beam thereto, comprising:
   modifying a power level of said laser beam into two or more power levels so as to correspond to said multi-leveled information; and
   setting aplurality of recording mark units including therein at least one recording mark to be formed, based on said modified power levels, so as to correspond to said multi-leveled information,
   wherein in said modifying said power level of said laser beam, at least one of said power levels is further changed in a level retention time thereof so as to correspond to said multi-leveled information.

9. The information recording method as claimed in claim 8, wherein each of said recording mark units has a power level that corresponds to the total area of said one or more recording marks included in each of said recording mark units.

10. The information recording method as claimed in claim 8, wherein each of said recording mark units includes one recording mark and has a track-direction length in a range of 0.5 to 1.0 times a beam diameter defined by $1/e^2$, and the area of said recording mark in each of said recording mark units is changed for recording said multi-leveled information.

11. The information recording method as claimed in claim 8, wherein said power level of said laser beam is modified into three power levels: a recording power level, an erasing power level, and a bias power level, with the respective power levels thereof being set in a decreasing order of said recording power level, said erasing power level, and said bias power level (said recording power level>said erasing power level>said bias power level).

12. The information recording method as claimed in claim 11, wherein in modifying said power level of said laser beam, at least one of said recording power level or said bias power level is further changed in said power level retention time thereof in accordance with said multi-leveled information.

* * * * *